No. 695,370. Patented Mar. 11, 1902.
B. F. BOYDSTON.
STARTING MECHANISM FOR HARVESTER CUTTING APPARATUS.
(Application filed Mar. 30, 1901.)
(No Model.) 2 Sheets—Sheet 1.
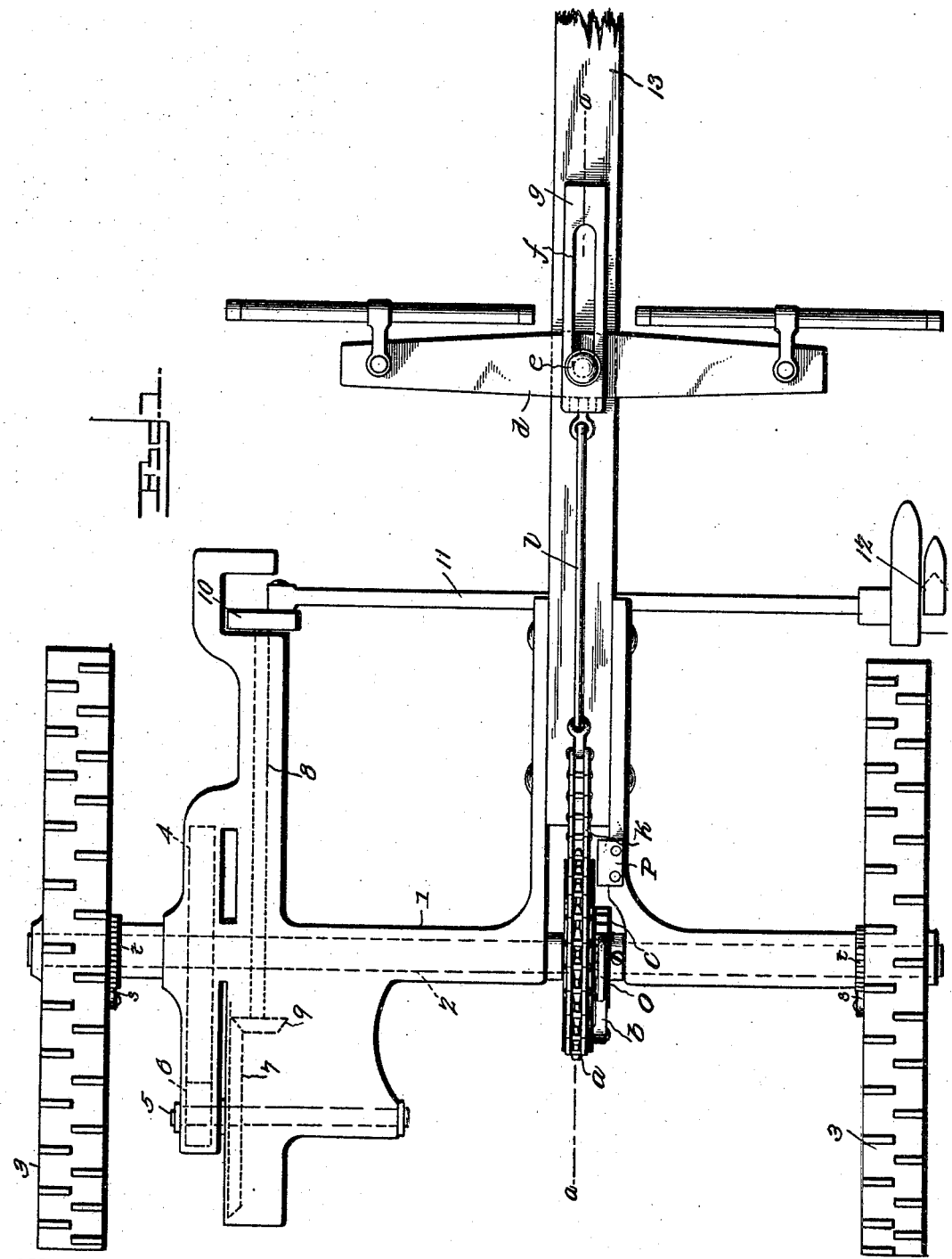
Witnesses
B. F. Boydston, Inventor
Attorneys

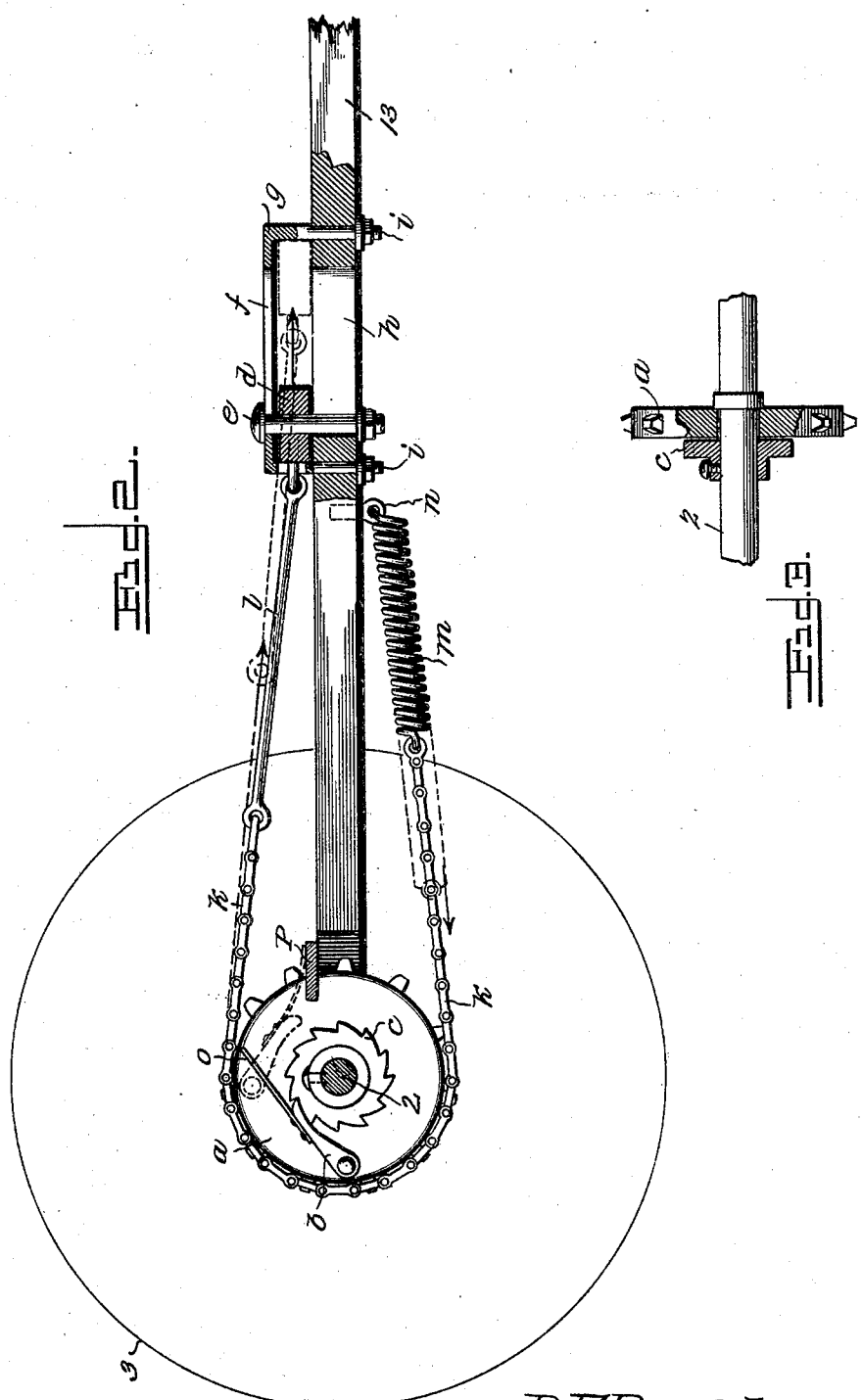

UNITED STATES PATENT OFFICE.

BENJAMINE F. BOYDSTON, OF EDGERTON, MISSOURI.

STARTING MECHANISM FOR HARVESTER CUTTING APPARATUS.

SPECIFICATION forming part of Letters Patent No. 695,370, dated March 11, 1902.

Application filed March 30, 1901. Serial No. 53,680. (No model.)

*To all whom it may concern:*

Be it known that I, BENJAMINE F. BOYDSTON, a citizen of the United States, residing at Edgerton, in the county of Platte and State of Missouri, have invented a new and useful Starting Mechanism for Harvester Cutting Apparatus, of which the following is a specification.

My invention is an improved starting mechanism for harvester cutting apparatus for imparting motion to the cutter-bar when the team starts prior to the starting of the machine; and it consists in the peculiar construction and combination of devices hereinafter fully set forth and claimed.

In the accompanying drawings, Figure 1 is a top plan view of a portion of a mowing or harvesting machine provided with an improved starting mechanism for the cutting apparatus embodying my improvements. Fig. 2 is a sectional view of the same, taken on a plane indicated by the line $a\,a$ of Fig. 1. Fig. 3 is a detail view.

The frame 1, driving-shaft 2, traction-wheels 3, driving-gear 4, counter-shaft 5, pinion 6, beveled gear 7, shaft 8, having beveled pinion 9, crank-wheel 10, and the pitman 11, connecting the crank-wheel 10 to the cutter-bar 12, are of the usual construction. The traction-wheels are, as usual, loosely mounted on the driving-shaft 2 and connected thereto by the usual pawl-and-ratchet mechanisms, (indicated in Fig. 1,) $s$ representing the pawls carried by wheels 3 and $t$ the ratchet-wheels fast on the driving-shaft, whereby the driving-shaft is capable of rotation independently of said traction-wheels. The cutter-bar is reciprocated by the power conveyed thereto by the pitman 11, and heretofore it has been necessary to start the machine forward and rotate the traction-wheels 3 before the cutting apparatus is started in operation. Owing to the inertia of the cutter-bar it is somewhat difficult to start the same in operation, particularly if the machine has been stopped while in operation with the standing grain or grass immediately in advance of the cutting apparatus, and in practice it has been heretofore necessary to back the machine slightly before starting it forward and in operation under such circumstances.

The object of my invention is to provide means for starting the cutting apparatus in operation prior to the forward movement of the machine, so that the cutting apparatus may be clear of any grass or grain engaged by its fingers and cutters and in full motion prior to the starting of the machine, thus obviating the necessity of backing the machine before starting it forward and also lessening the initial draft on the team.

In the embodiment of my invention I employ a sprocket-wheel $a$, which is loosely mounted on the driving-shaft 2 at a point directly in rear of the tongue 13. The said sprocket-wheel carries a pawl $b$, which is adapted to engage a ratchet-wheel $c$, that is fast on the driving-shaft and is proximate to one side of the sprocket-wheel. The doubletree $d$ is adapted to move forward and rearward on the tongue and is supported on a pin or bolt $e$, which forms its pivot and which operates in a slot $f$, with which a traveler $g$ is provided, and also operates in a slot $h$ in the tongue. The said traveler is here shown as of substantially inverted-U shape and is provided at its front and rear ends with bolts $i$, by means of which it is secured on the tongue; but the traveler may be of any suitable construction and any suitable means may be employed for connecting the doubletree to the tongue which will admit of the movement of the doubletree forward and rearward with relation to the tongue. A sprocket-chain $k$ engages the sprocket-wheel $a$. One end of the said sprocket-chain is connected to the doubletree, preferably at the center of the latter, and in the embodiment of my invention here shown I employ a link-rod $l$ for connecting the said sprocket-chain to the doubletree. The opposite end of the sprocket-chain is connected to a spring $m$, which is here shown as a coiled retractile spring, the rear end of which is connected to the sprocket-chain and the front end of which is attached to the tongue, on the under side of the latter, by an eyebolt $n$.

It will be understood from the foregoing that when the team is started the initial impulse thereof will draw the doubletree forward, hence causing the chain $k$ to partly rotate the sprocket-wheel $a$, and thereby, through the pawl $b$ and ratchet $c$, rotate the driving-shaft 2 before the machine is started in motion, the partial rotation of the driving-shaft through the usual gears and connections starting the cutting apparatus in operation prior to the forward movement of the machine. The lost motion of the doubletree and the spring $m$ lessens the strain on the team in starting the machine, and the said spring after the machine is in motion returns the doubletree to its initial position.

My improved starting mechanism is not only effective for starting the cutting apparatus in operation prior to the forward movement of the mowing-machine or harvester, but is also efficient in keeping the cutting mechanism in operation at regular speed when the machine is passing over inequalities in the surface of the field.

The pawl 6 has a forward-extending arm $o$, (here shown as a spring,) which when the wheel $a$ has been turned sufficiently to start the cutting apparatus engages a projection $p$ on the frame 1 and automatically trips the pawl from the ratchet-wheel, thereby releasing the wheel $a$, as will be understood.

Having thus described my invention, I claim—

1. In a mowing-machine or harvester, the combination of a spring-retracted draft element, an initially-effective revoluble element loose on the driving-shaft, a connection between said draft element and said revoluble element, means, including a movable member, to lock said revoluble element to said driving-shaft, to cause said revoluble element to rotate said driving-shaft in one direction, and means independent of the locking means, to automatically trip the movable member thereof after the machine is started, and maintain said tripped member in disengaged position, while the machine continues in operation, and thereby permit said driving-shaft to rotate independently of said revoluble element and the latter to remain at rest, substantially as described.

2. In a mowing-machine or harvester, the combination of a spring-retracted draft element, a sprocket-wheel loose on the driving-shaft, pawl-and-ratchet mechanism connecting said sprocket-wheel to said driving-shaft, and a sprocket-chain on said sprocket-wheel and connected to said draft element, substantially as described.

3. In a mowing-machine or harvester, having a driving-shaft revoluble independently of the traction-wheels and connections between said driving-shaft and a cutting apparatus, the combination of a sprocket-wheel on said driving-shaft, a pawl-and-ratchet mechanism to lock the same thereto when said sprocket-wheel is turned in one direction, a spring to turn said sprocket-wheel in the reverse direction, a doubletree movable forward and rearward on the tongue and a sprocket-chain connecting said doubletree to said spocket-wheel, substantially as described.

4. In a mowing-machine or harvester, the combination of a spring-retracted draft element, a driving-shaft, a ratchet-wheel fast on the latter, a reversely-movable element connected to and operated by said spring-retracted draft element, a pawl carried by said reversely-movable element, to engage said ratchet-wheel and means to automatically disengage said pawl from said ratchet-wheel, substantially as described.

In testimony that I claim the foregoing as my own I have hereto affixed my signature in the presence of two witnesses.

BENJAMINE F. BOYDSTON.

Witnesses:
R. H. GUNN,
T. T. THOMAS.